United States Patent [19]

Watanabe

[11] Patent Number: 4,539,810
[45] Date of Patent: Sep. 10, 1985

[54] APPARATUS FOR CONTROLLING A GAS TURBINE ENGINE

[75] Inventor: Atsushi Watanabe, Shizuoka, Japan

[73] Assignee: Toyota Jidosha Kabushiki Kaisha, Toyota, Japan

[21] Appl. No.: 506,833

[22] Filed: Jun. 22, 1983

[30] Foreign Application Priority Data

Jul. 8, 1982 [JP] Japan .................................. 57-117785

[51] Int. Cl.³ ............................. F02C 3/10; F02C 9/22
[52] U.S. Cl. .................................. 60/39.161; 60/39.25
[58] Field of Search ................. 60/39.25, 39.29, 39.161

[56] References Cited

U.S. PATENT DOCUMENTS

| | | | |
|---|---|---|---|
| 3,211,424 | 10/1965 | Lewakowski | 60/39.25 |
| 3,357,178 | 12/1967 | Meyers | 60/39.25 |
| 3,814,537 | 6/1974 | Stoltman | 60/39.25 |
| 3,844,114 | 10/1974 | Nonnenmann et al. | 60/39.25 |
| 3,938,321 | 2/1976 | Davis et al. | 60/39.25 |
| 4,245,464 | 1/1981 | Hitzelberger | 60/39.25 |

Primary Examiner—Louis J. Casaregola
Attorney, Agent, or Firm—Cushman, Darby & Cushman

[57] ABSTRACT

A control apparatus for a gas turbine engine comprises an accelerating condition detecting mechanism and an operating speed control mechanism. The accelerating condition detecting mechanism detects the degree of acceleration in the engine. The operating speed control mechanism controls, depending upon the degree of the acceleration, the speed for opening variable nozzles installed in the inlet portion of a power turbine of the engine, and/or variable inlet guide vanes installed in the inlet portion of a compressor of the engine.

9 Claims, 11 Drawing Figures

APPARATUS FOR CONTROLLING A GAS TURBINE ENGINE

BACKGROUND OF THE INVENTION

1. Field of the Invention

The present invention relates to a control apparatus for a gas turbine engine.

2. Description of the Prior Art

Gas turbine engines used for automobiles usually comprise a single rotating shaft assembly or double rotating shaft assemblies. Most gas turbine engines with a single rotating shaft assembly have variable inlet guide vanes (VIGV's) installed in the inlet portion of the compressor for adjusting the flow rate of the intake air. On the other hand, most gas turbine engines with double rotating shaft assemblies have both VIGV's installed in the inlet portion of the compressor and variable nozzles (VN's) installed in the inlet portion of the power turbine to adjust the flow rate of gas. During an accelerating condition of the engine, VIGV's are operated toward the opening direction to increase the flow rate of the intake air. The amount of fuel is also increased to raise the gas temperature in the inlet portion of the power turbine, thereby increasing the engine acceleration performance. The VN's are also operated toward the opening direction to raise the gas temperature at the inlet port of the gasifier turbine in order to increase engine acceleration performance.

In the conventional art, operation speeds of the VN's and VIGV's are maintained constant at all times. This, however, is a problem. Generally, VN's and VIGV's are operated at speeds as great as possible (maximum speeds) to improve engine acceleration performance at full throttle. With the VN's and VIGV's being operated at maximum speeds at all times, however, the VN's or VIGV's may operate at fast speeds even under an acceleration condition in which the running speed of the compressor should be increased by a small amount, causing the running speed of the compressor to be greatly changed. Therefore, when an automobile mounting a gas turbine engine of this type is run according to a predetermined running pattern, fuel is consumed in very large amounts, deteriorating the fuel efficiency.

SUMMARY OF THE INVENTION

It is, therefore, an object of the present invention to provide an apparatus for controlling a gas turbine engine, whereby the fuel efficiency can be greatly improved.

The above object is achieved by an apparatus for controlling a gas turbine engine comprising: a means for detecting the accelerating condition of the engine, and a means using the detected accelerating condition for controlling the speed for opening variable nozzles installed in an inlet portion of a power turbine of the engine to adjust a flow rate of gas or variable inlet guide vanes installed in an inlet portion of a compressor of the engine and adjust a flow rate of the intake air.

The above and other related objects and features of the present invention will be apparent from the description of the present invention set forth below, with reference to the accompanying drawings, as well as from the appended claims.

DESCRIPTION OF THE PREFERRED EMBODIMENTS

Figure 1:
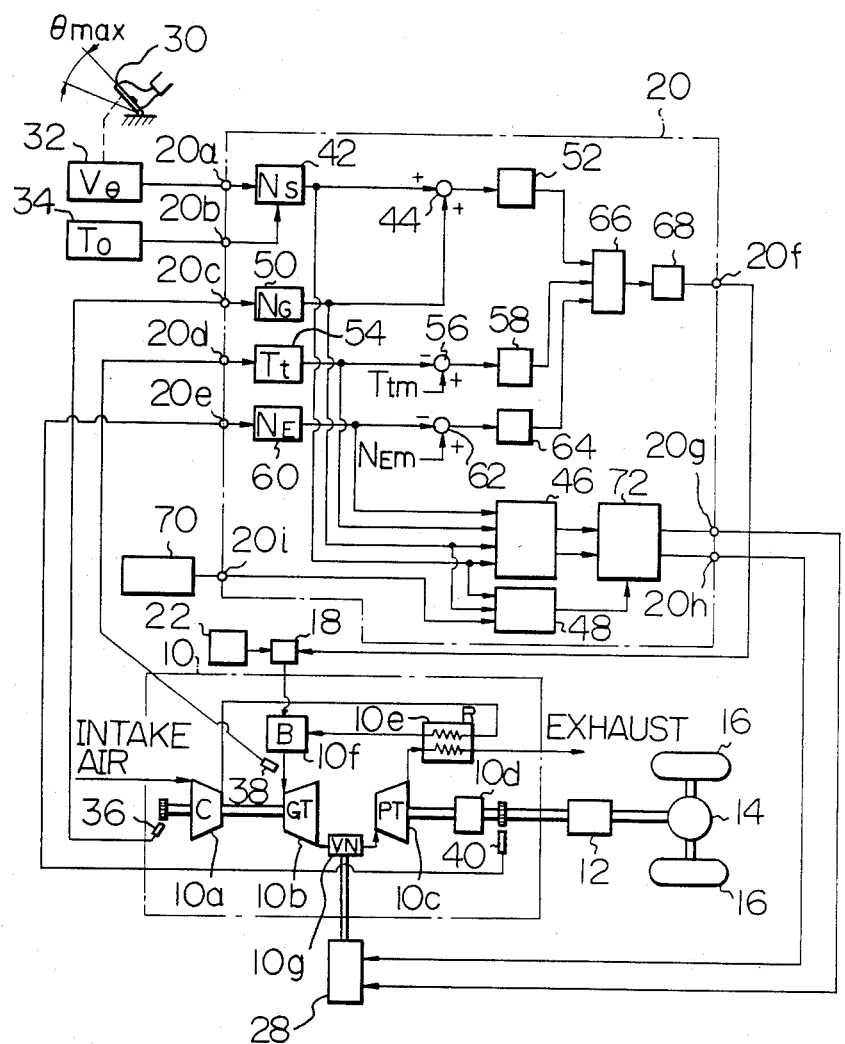
FIG. 1 is a block diagram schematically illustrating the overall constitution of a first embodiment according to the present invention.

FIG. 1 schematically illustrates a gas turbine engine with double rotating shaft assemblies according to a first embodiment of the present invention. In FIG. 1, reference numeral 10 denotes the gas turbine engine with double rotating shaft assemblies. The output torque of the engine 10 is transmitted to wheels 16 of an automobile via a transmission gear 12, and a differential gear 14.

The gas turbine engine 10 with double rotating shaft assemblies provides a compressor (C) 10a and a gasifier turbine (GT) 10b that are coupled together through the same axle and called a gas generator and further provides a power turbine (PT) 10c connected to the transmission gear 12 via a reduction gear 10d. The intake air is compressed by the compressor 10a, and high pressure air is supplied to a burner (B) 10f via a regenerator (R) (heat exchanger) 10e. The burned gas from the burner 10f flows to the gasifier turbine 10b to drive it, then flows, via variable nozzles (VN's) 10g, to the power turbine 10c to drive it, and is exhausted via the regenerator 10e.

The rate of supply of fuel to the burner 10f is controlled by a metering valve 18 which is continuously or intermittently operated by drive signals sent from a control circuit 20 via an output terminal 20f. The compressed fuel is supplied from a fuel tank 22 to the metering valve 18.

The angle of the VN's 10g is variable so that the ratio of work between the gasifier turbine 10b and the power turbine 10c can be changed to vary the gas temperature in the inlet portion of the gasifier turbine 10b and adjust the efficiency of the engine. Further, the angle of VN's can be changed at varying speeds. The VN's 10g are driven by an actuator 28 which is operated by drive signals that are sent from the control circuit 20 via output terminals 20g and 20h.

An accelerator pedal voltage is sent, via an input terminal 20a, to the control circuit 20 from an accelerator voltage converter circuit 32 which generates a voltage corresponding to the depressed amount of the accelerator pedal 30 or which generates a voltage obtained by functionally converting the above-mentioned voltage.

An atmospheric temperature sensor 34 consisting of, for instance, a thermistor, or a resistance thermometer bulb of platinum, produces and sends a voltage representing the atmospheric temperature $T_0$ to the control circuit 20 via an inlet terminal 20b.

Pulses having a frequency corresponding to the running speed $N_G$ of the gas generator (compressor 10a and gasifier turbine 10b) are sent from an electromagnetic pick-up 36 to the control circuit 20 via an input terminal 20c.

A gas-temperature sensor 38 consisting of, for instance, a thermocouple, produces and applies a voltage representing the gas temperature Tt at the inlet portion of the gasifier turbine 10b to the control circuit 20 via an input terminal 20d.

Pulses having a frequency corresponding to the running speed $N_E$ of the power turbine 10c are sent from an electromagnetic pick-up 40 to the control circuit 20 via an input terminal 20e.

Outputs of the accelerator voltage converter circuit 32 and the atmospheric temperature sensor 34 are sent to an atmospheric temperature correcting circuit 42 which corrects the accelerator pedal voltage depending upon the atmospheric temperature $T_0$ to produce desired running speed signals. If $V_0$ denotes the accelerator pedal voltage, and $K_1$ denotes a constant, the desired running speed signal is given, for example, by $V_0 \cdot (1 + K_1 \cdot T_0)$, and is sent to an adding point 44, to an opening-closing instruction circuit 46 for instruction the opening and closing of VN's 10g, and to an operation speed instruction circuit 48 for controlling the operation speed of VN's 10g.

Pulses from the electromagnetic pick-up 36 are applied to a frequency/voltage (F/V) converter 50 and are converted into a voltage which is proportional to the actual running speed $N_G$ of the gas generator. The output of the F/V converter 50 is sent to the adding point 44, to the opening-closing instruction circuit 46, and to the operation speed instruction circuit 48.

The adding point 44 and a fuel flow rate-setting circuit 52 connected thereto produce fuel flow rate control signals to increase or decrease the flow rate of fuel depending upon the difference between the desired running speed signal sent from the atmospheric temperature correcting circuit 42 and the actual running speed signal of the gas generator sent from the F/V converter 50. The adding point 44 comprises, for instance, a differential amplifier. The fuel flow rate-setting circuit 52 comprises, for instance, an integrator. When a desired running speed $N_S$ represented by a desired running speed signal is greater than an actual running speed $N_G$, the circuit works so as to increase the fuel flow rate control signals depending upon the difference $(N_S - N_G)$. When the situation is contrary to the above, the circuit works so as to decrease the fuel flow rate control signals depending upon the difference.

Detection voltage from a gas temperature sensor 38 is applied to an adding point 56 and to the opening-closing instruction circuit 46 via an amplifier 54. To the adding point 56 is also applied a constant voltage which corresponds to a maximum allowable gas temperature Ttm that has been determined beforehand. When the actual temperature Tt at the inlet portion of the gasifier turbine 10b is lower than the maximum allowable gas temperature Ttm, the adding point 56 and the fuel flow rate-setting circuit 58 connected thereto produce fuel flow rate control signals of a value greater than the fuel flow rate control signals produced by the circuit 52. When the actual temperature Tt becomes greater than the maximum allowable gas temperature Ttm, the adding point 56 and the circuit 58 produce fuel flow rate control signals of a value which decreases with the increase in the difference between them.

Pulses from the electromagnetic pick-up 40 are converted through an F/V converter 60 into a voltage which is proportional to the actual running speed $N_E$ of the power turbine 10c. The voltage is sent to an adding point 62 and to the opening-closing instruction circuit 46. To the adding point 62 is also applied a constant voltage which corresponds to a maximum allowable running speed $N_{Em}$ of the power turbine 10c. When the actual running speed $N_E$ of the power turbine 10c is smaller than the maximum allowable running speed $N_{Em}$, the adding point 62 and the fuel flow rate-setting circuit 64 connected thereto produce fuel flow rate control signals of a value greater than the fuel flow rate control signals produced by the circuit 52. When the practical running speed $N_E$ becomes greater than the maximum allowable running speed $N_{Em}$, the adding point 62 and the circuit 64 produce fuel flow rate control signals of a value which decreases with the increase in the difference between them.

Outputs of the fuel flow rate-setting circuits 52, 58, and 64 are applied to a minimum value selection circuit 66 which selects the smallest signals among the applied signals and sends them to a drive circuit 68.

The drive circuit 68 produce drive signals responsive to the input signals and sends them to a metering valve 18. If the metering valve 18 is a continuously operating type, a drive current having a current value which corresponds to the input signal is produced at the drive circuit 68. If the metering valve 18 is an intermittently operating type, the input signals are compared with a reference signal of a triangular wave. Then, depending upon the result of comparison, a drive current of a rectangular waveform of which the duty ratio corresponds to the input signal is produced at the drive circuit 68.

The opening-closing instruction circuit 46 provides instructions to drive the VN's 10g in the opening direction or in the closing direction, depending upon a desired running speed of the gas generator determined by the depressed amount of the accelerator pedal and by the atmospheric temperature and depending upon the actual running speed of the gas generator, the gas temperature in the inlet portion of the gasifier turbine, and the actual running speed of the power turbine.

The operation speed instruction circuit 48 provides instructions on the opening speed or closing speed of VN's 10g depending upon the desired running speed of the gas generator, the actual running speed of the gas generator, and the voltage sent from a hand-operated adjuster 70 via an input terminal 20i.

A drive circuit 72 drives the actuator 28 in response to instruction signals from the opening-closing instruction circuit 46 and the operation speed instruction circuit 48.

Figure 2:
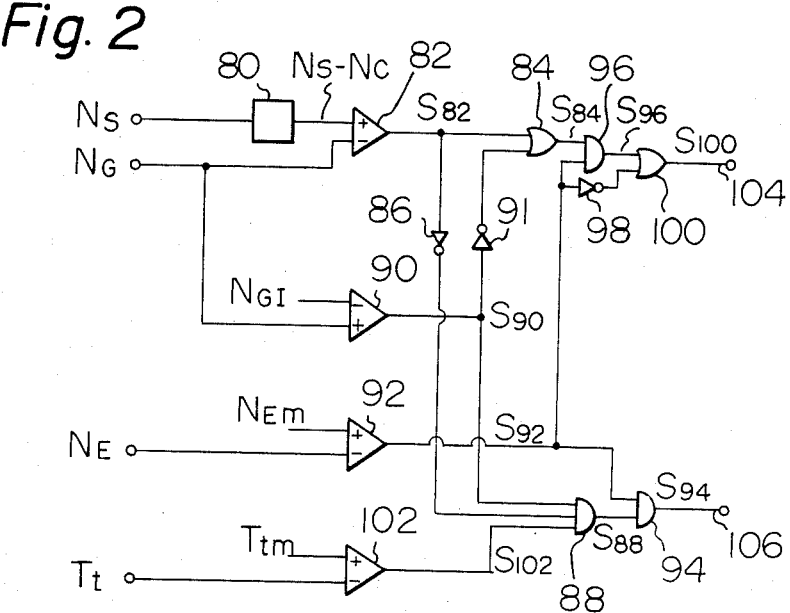
FIG. 2 is a block diagram illustrating the constitution of an opening-closing instruction circuit in FIG. 1.
Figure 3:
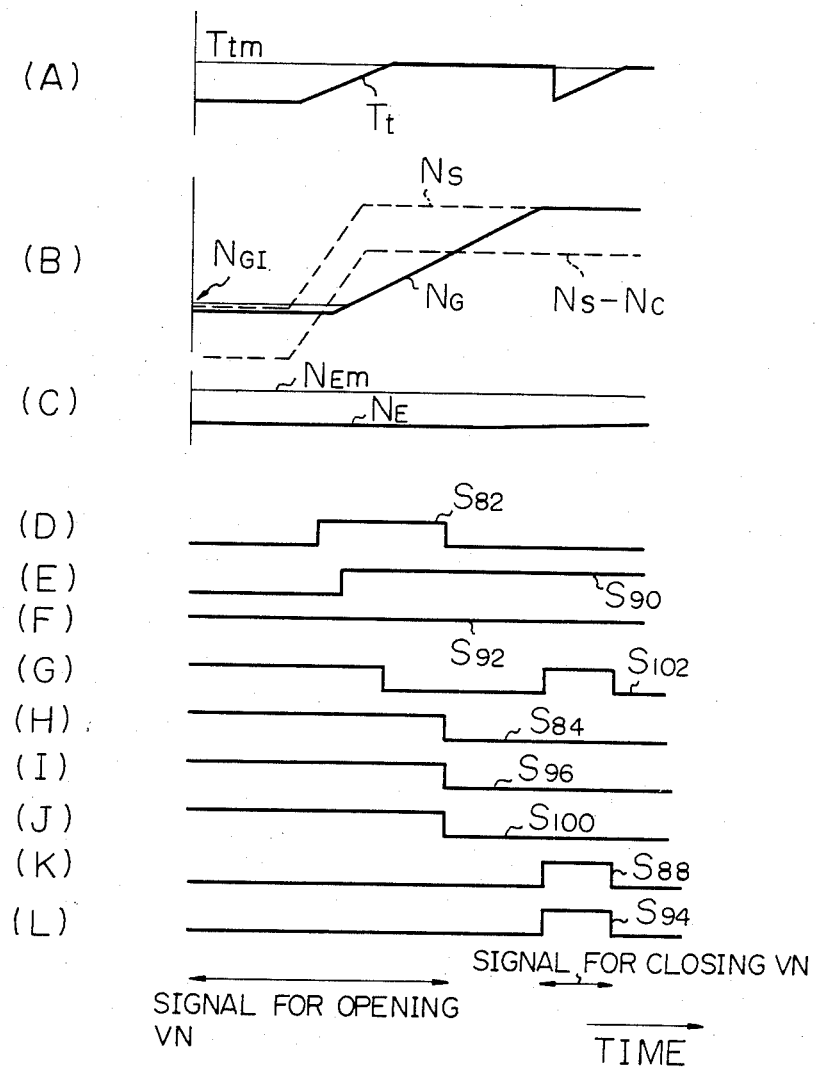
FIG. 3 is a waveform diagram illustrating waveforms of signals in the circuit of FIG. 2.

FIG. 2 is a block diagram which illustrates in detail the setup of the opening-closing instruction circuit 46 of FIG. 1. FIG. 3 is a diagram of signal waveforms at each of the portions of the circuit of FIG. 2. In FIG. 2, reference numeral 80 denotes a subtractor which performs the subtraction $N_S - N_C$ ($N_C$ is a constant) for a desired running speed $N_S$ of the gas generator, that is sent from the atmospheric temperature correcting circuit 42 of FIG. 1. The output of the subtractor 80 is compared by a comparator 82 with a signal which is sent from the F/V converter 50 and which represents the actual running speed $N_G$ of the gas generator. Therefore, the output $S_{82}$ of the comparator 82 assumes the logic level "1" only when $N_S - N_C > N_G$ and assumes the logic level "0" in other cases (refer to FIGS. 3(B) and 3(D)). The output $S_{82}$ of the comparator 82 is sent to an OR gate 84 and is further sent to an AND gate 88 via an inverter 86.

A signal representing the actual running speed $N_G$ of the gas generator is further sent to a comparator 90 where it is compared with a constant voltage which represents a constant running speed $N_{GI}$ that is faster than an idling speed of the gas generator by a value of several hundred to several thousand rpm (for instance, if the idling speed is 20,000 rpm, $N_{GI}$ is about 21,000 rpm). The output $S_{90}$ of the comparator 90 assumes the logic level "0" when $N_G < N_{GI}$, i.e., when $N_G$ is close to the idling speed while the engine is operating, and assumes the logic level "1" in other cases (refer to FIGS. 3(B) and 3(E)). The output $S_{90}$ of the comparator 90 is sent to an AND gate 88 and to an OR gate 84 via an inverter 91.

A signal which is sent from the F/V converter 60 and which represents an actual running speed $N_E$ of the power turbine 10c is applied to a comparator 92 and is compared with a constant voltage which represents a maximum allowable running speed $N_{Em}$ of the power turbine 10c. When $V_{Em} < N_E$, the output $S_{92}$ of the comparator 92 assumes the logic level "0". In other cases, the output $S_{92}$ assumes the logic level "1". The output $S_{92}$ of the comparator 92 is sent to AND gates 94 and 96 and is further sent to an OR gate 100 via an inverter 98.

A signal which is sent from the gas temperature sensor 38 via an amplifier 54 and which represents the actual gas temperature Tt at the inlet portion of the gasifier turbine is applied to a comparator 102 and is compared with a constant voltage which represents the maximum allowable gas temperature Ttm. The output $S_{102}$ of the comparator 102 assumes the logic level "0" when Ttm < Tt and assumes the logic level "1" in other cases (refer to FIGS. 3(A) and 3(G)). The output $S_{102}$ of the comparator 102 is applied to an AND gate 88.

The output $S_{84}$ (refer to FIG. 3(H)) of the OR gate 84 is applied to the AND gate 96 to form an output $S_{96}$ (refer to FIG. 3(I)). The output $S_{96}$ of the AND gate 96 is applied to the OR gate 100 which performs an OR operation together with the output $S_{92}$ from the comparator 92 via the inverter 98, to produce an output $S_{100}$ (refer to FIG. 3(J)) that will be sent to the drive circuit 72 via a line 104.

On the other hand, the output $S_{88}$ (refer to FIG. 3(K)) of the AND gate 88 is applied to the AND gate 94 where it is subjected to the AND operation together with the output $S_{92}$ from the comparator 92. The output $S_{94}$ (refer to FIG. 3(L)) of the AND gate 94 is sent to the drive circuit 72 via a line 106.

Therefore, the opening-closing instruction circuit of FIG. 2 instructs the VN's 10g to move in the opening direction in the below-mentioned three cases.

(1) When the actual running speed $N_E$ of the power turbine 10d is equal to or smaller than a maximum allowable value $N_{Em}$ ($N_E \leq N_{Em}$), and the desired running speed $N_S$ of the gas generator is greater than the actual running speed $N_G$ by more than $N_C$ ($N_S - N_C > N_G$);

(2) When $N_E \leq N_{Em}$ and the actual running speed $N_G$ of the gas generator is smaller than $N_{GI}$ ($N_G < N_{GI}$), i.e., when the gas generator is in an idling operation; and (3) When the actual running speed $N_E$ of the power turbine 10d is in excess of the maximum allowable value $N_{Em}$ ($N_E > N_{Em}$).

Conversely, the opening-closing instruction circuit instructs the VN's 10g to move in the closing direction in the below-mentioned case only.

That is, when the running speed $N_E$ of the power turbine 10d is equal to or smaller than the maximum allowable value $N_{Em}$ ($N_E \leq N_{Em}$), the gas temperature Tt at the inlet portion of the gasifier turbine is equal to or smaller than the maximum allowable value Ttm (Tt $\leq$ Ttm), the actual running speed $N_G$ of the gas generator is equal to or greater than a predetermined value $N_{GI}$ ($N_G \geq N_{GI}$), i.e., the actual running speed $N_G$ is different from the idling speed, and the actual running speed $N_G$ of the gas generator is equal to or greater than a value ($N_S - N_C$) which is obtained by subtracting a constant value $N_C$ from the desired running speed $N_S$ (i.e., $N_S - N_C \leq N_G$).

Figure 4:
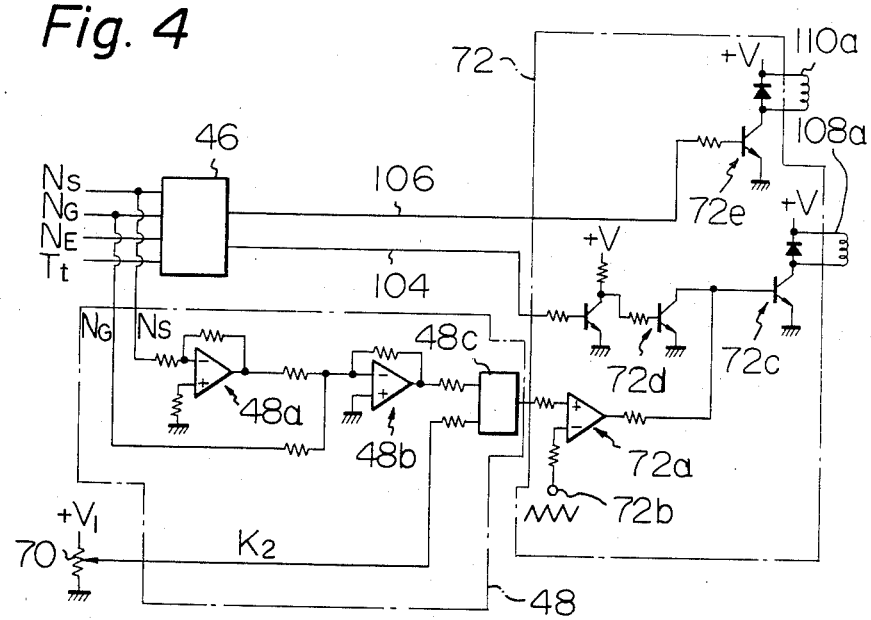
FIG. 4 is a block diagram illustrating in detail the constitution of an operation speed instruction circuit and a drive circuit in FIG. 1.

FIG. 4 is a block diagram which closely illustrates the operation speed instruction circuit 48 and the drive circuit 72 of FIG. 1. In FIG. 4, the hand-operated adjuster 70 consists of a potentiometer. The operation speed instruction circuit 48 consists of an inverting amplifier 48a, an adder 48b, and a multiplier 48c.

A desired running speed signal from the atmospheric temperature correcting circuit 42 is inverted by an inverting amplifier 48a and thereafter applied to an adder 48b which is served with actual running speed signals of the gas generator sent from the F/V converter 50. Therefore, the output of the adder 48b is $K_1(N_S - N_G)$, where $K_1$ is a constant determined by a ratio of input resistance to feedback resistance of the adder 48b. If a voltage which is manually set using the potentiometer 70 is denoted by a constant $K_2$, the output of the multiplier 48c is given by $K_1 \cdot K_2 \cdot (N_S - N_G)$. Namely, the output of the multiplier 48c varies in proportion to the difference between the desired running speed $N_S$ and the actual running speed $N_G$ of the gas generator and is sent to the drive circuit 72 as a signal for instructing the operation speed of VN's 10g.

In the drive circuit 72, the above-mentioned signals from the operation speed instruction circuit 48 are applied to a comparator 72a. In the comparator 72a, the applied signals are compared with triangular wave or saw-tooth wave signals which are applied through a terminal 72b and which have a predetermined amplitude and a predetermined frequency. Therefore, the comparator 72a produces rectangular wave signals having a duty ratio which corresponds to operation speed instruction signals. That is, the comparator 72a produces rectangular wave signals having a duty ratio proportional to ($N_S - N_G$).

The rectangular wave signals are applied to the base of a drive transistor 72c which controls a current for driving an exciting coil 108a of the solenoid valve 108. The base of the drive transistor 72c is also connected to the collector of a transistor 72d which will be rendered nonconductive when a signal of the logic level "1" is applied thereto from the opening-closing instruction circuit 46 via the line 104. In this case, therefore, the drive transistor 72c is rendered conductive and nonconductive in response to the rectangular wave signals, and the exciting coil 108a is intermittently energized correspondingly. When the signal sent via the line 104 has the logic level "0", the transistor 72d is rendered conductive, and output of the comparator 72a is grounded. Accordingly, the drive transistor 72c is not driven.

When a signal of the logic level "1" is applied from the opening-closing instruction circuit 46 via the line 106, the drive transistor 72e is rendered conductive only during that moment to energize an exciting coil 110a of a solenoid valve 110 in the actuator 28.

Figure 5:
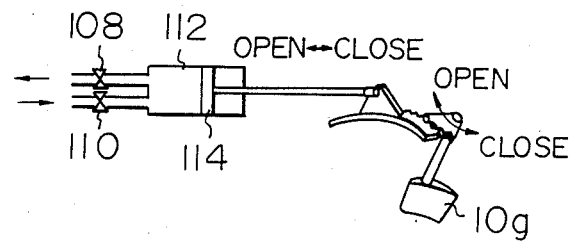
FIG. 5 is a diagram schematically illustrating an actuator and a part of VN's in FIG. 1.

FIG. 5 schematically illustrates the actuator 28 and a part of the VN's 10g connected thereto. Although FIG. 5 shows only one VN, a plurality of VN's 10g which are actually opened and closed by oil introduced into a cylinder 112 and a spring (not shown). As the solenoid valve 110 is energized and opened, the oil is allowed to enter into the cylinder 112, whereby a piston 114 moves right in the drawing, and the VN's 10g move toward the closing direction. As the solenoid valve 108 is energized and opened, the piston 114 is pushed left by the spring, and the oil flows out of the cylinder 112, so that the VN's 10g move toward the opening direction. In this case, the solenoid valve 108 is turned on and off in response to the above-mentioned rectangular wave signals. Therefore, the rate at which the oil flows out of the cylinder 114, i.e., the speed for opening the VN's 10g, is controlled depending upon the duty ratio of rectangular wave signals. In other words, the speed for opening the VN's 10g is controlled to a value which corresponds to $(N_S - N_G)$.

Figure 6:
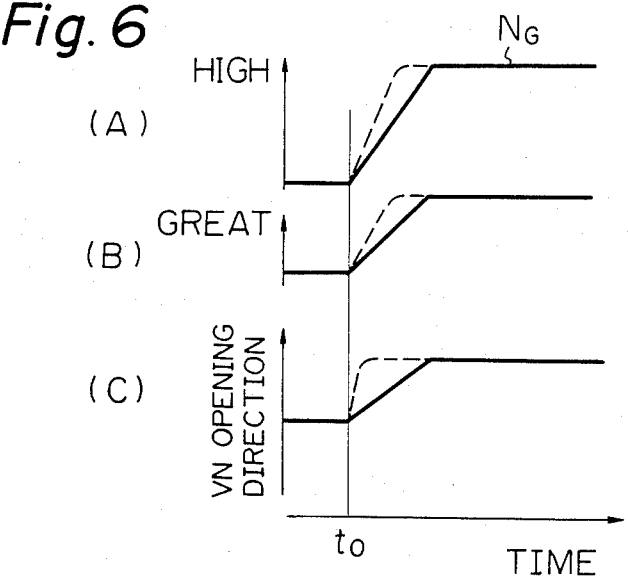
FIG. 6 is a waveform diagram illustrating the operation and effects of the first embodiment.

FIG. 6 illustrates (A) a running speed $N_G$ of the gas generator, (B) a flow rate of fuel, and (C) a speed for opening VN, according to the above-mentioned embodiment and the conventional art, in which the abscissa represents time. While the running speed of the gas generator is slightly increased starting from the time $t_0$, according to the conventional art, the VN's 10g are opened at a maximum speed at all times as indicated by a broken line in FIG. 6(C). Therefore, the running speed of the gas generator rises quickly as indicated by a broken line in FIG. 6(A). In this case, however, since the flow rate of fuel abruptly increases as indicated by a broken line in FIG. 6(B), the consumption of fuel increases correspondingly. According to the above-mentioned embodiment of the present invention, on the other hand, the speed for opening the VN's 10g is controlled depending upon a value $(N_S - N_G)$. When the gas generator is accelerated to a small degree, therefore, the VN's 10g are opened at a low speed as indicated by a solid line in FIG. 6(C). Accordingly, the flow rate of fuel increases gradually as indicated by a solid line in FIG. 6(B), and the consumption of fuel during the transient period is reduced compared with that of the conventional art. Thus, the consumption of fuel can be greatly reduced when the vehicle is run according to predetermined patterns.

Figure 7:
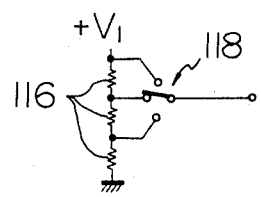
FIG. 7 is a circuit diagram illustrating another example of a hand-operated adjuster.

In the above-mentioned embodiment, the hand-operated adjuster 70 is made up of a potentiometer (see FIG. 4). The hand-operated adjuster, however, may be composed of a plurality of resistors 116 which are connected in series and a switch 118 for selecting the connection points, as illustrated in FIG. 7.

Figure 8:
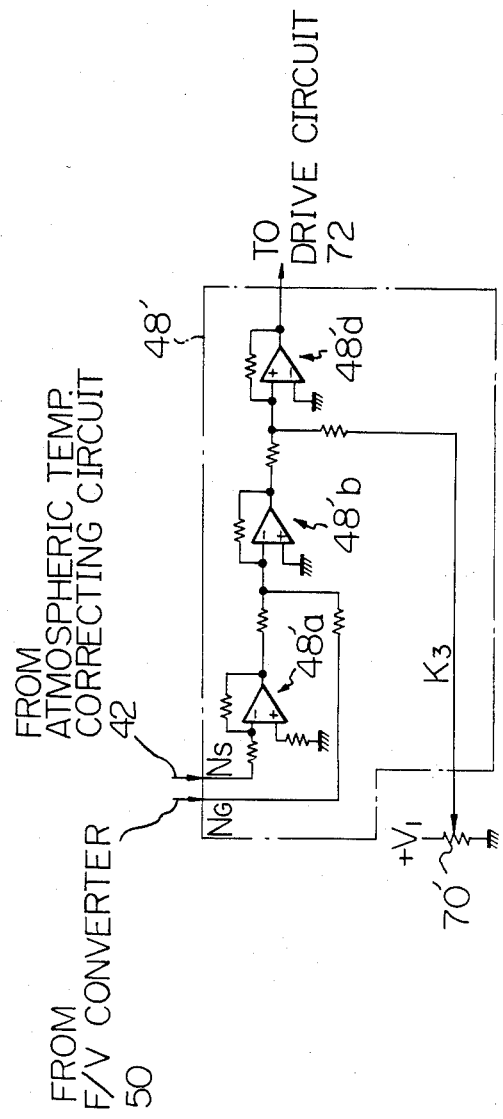
FIG. 8 is a block diagram illustrating in detail an operation speed instruction circuit according to a second embodiment of the present invention.

FIG. 8 is a block diagram of the operation speed instruction circuit according to another embodiment (second embodiment) of the present invention. In this embodiment, constitution, functions, and effects of other portions which are not diagrammed are the same as those of the first embodiment and are not explained here. As will be obvious from FIG. 8, the operation speed instruction circuit 48' of this embodiment employs an adder 48'd instead of the multiplier 48c that was employed in the operation speed instruction circuit 48 of FIG. 4. However, the inverting amplifier 48'a and the adder 48'b have been constructed in quite the same manner as those of FIG. 4. According to this embodiment, therefore, a signal representing $K_1(N_S - N_G) + K_3$ is sent to the drive circuit 72 as an operation speed instruction signal. Here, $E_3$ is a constant which represents a voltage which is manually set using the potentiometer 70'.

Figure 9:
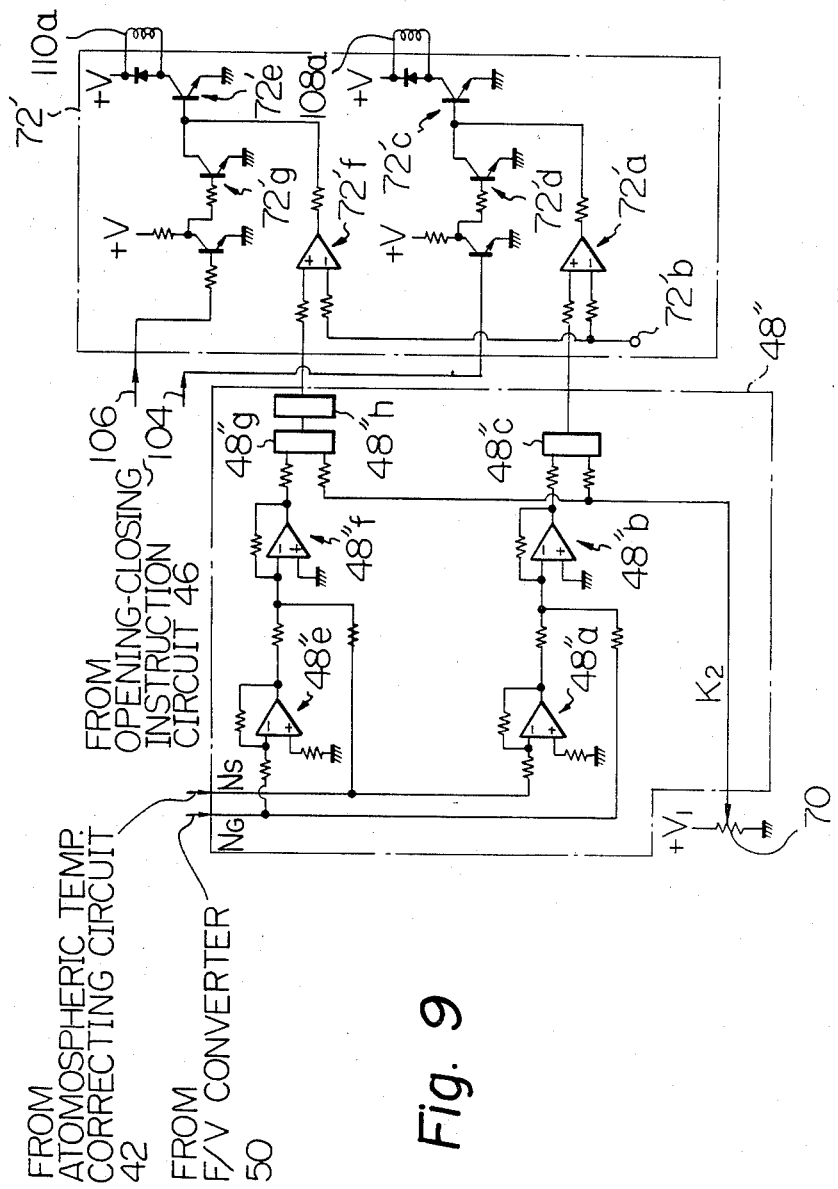
FIG. 9 is a block diagram illustrating in detail an operation speed instruction circuit according to a third embodiment of the present invention.

FIG. 9 is a block diagram of the operation speed instruction circuit and the circuit for driving VN's 10g according to a further embodiment (third embodiment) of the present invention. In this embodiment, the constitution, functions, and effects of other portions which are not diagrammed are also quite the same as those of the first embodiment. According to this embodiment, not only the speed for opening the VN's 10g but also the speed for closing the VN's 10g is controlled depending upon the difference between the desired running speed $N_S$ and the actual running speed $N_G$ of the gas generator and depending upon a value which is manually set.

In FIG. 9, therefore, the inverting amplifier 48"a, adder 48"b, and multiplier 48"c in the operation speed instruction circuit 48" and the comparator 72'a, terminal 72'b, drive transistor 72'c, and transistor 72'd in the drive circuit 72' are constructed quite in the same manner as those of FIG. 4, such that the speed for moving VN's 10g in the opening direction is controlled depending upon a value $K_1 \cdot K_2 \cdot (N_S - N_G)$. In the operation speed instruction circuit 48" of FIG. 9, on the other hand, signals corresponding to the actual running speed $N_G$ of the gas generator are applied to the inverting amplifier 48"e, and the adder 48"f is served with outputs of the inverting amplifier 48"e and signals representing the desired running speed $N_S$ of the gas generator to add them together. Therefore, the multiplier 48"g receives output which represents $K_1 \cdot (N_G - N_S)$ as well as a voltage $K_2$ from the potentiometer 70 and produces an output which represents $K_1 \cdot K_2 \cdot (N_G - N_S)$. The output of the multiplier 48"g is applied to a limiter 48"h which produces an output corresponding to $K_4$ when the output of the multiplier 48"g is $K_1 \cdot K_2 \cdot (N_G - N_S) > K_4$, where $K_4$ is a constant greater than 0. The comparator 72'f, drive transistor 72'e, and transistor 72'g in the drive circuit 72' are constructed in the same manner as in FIG. 4. Therefore, the speed for moving the VN's 10g in the closing direction is controlled depending upon a value which corresponds to $K_1 \cdot K_2 \cdot (N_G - N_S)$.

The above description deals with the case in which both the gain of adder 48"b and the gain of adder 48"f have the same value $K_1$. The gains, however, may have different values, such that the VN's 10g are moved in the opening direction and in the closing direction at dissimilar speeds. If the potentiometer 70 is provided for each of the multipliers 48"c and 48"g, the speed for moving the VN's 10g in the opening direction and in the closing direction can be set at different values by a driver through manual operation.

Figure 10:
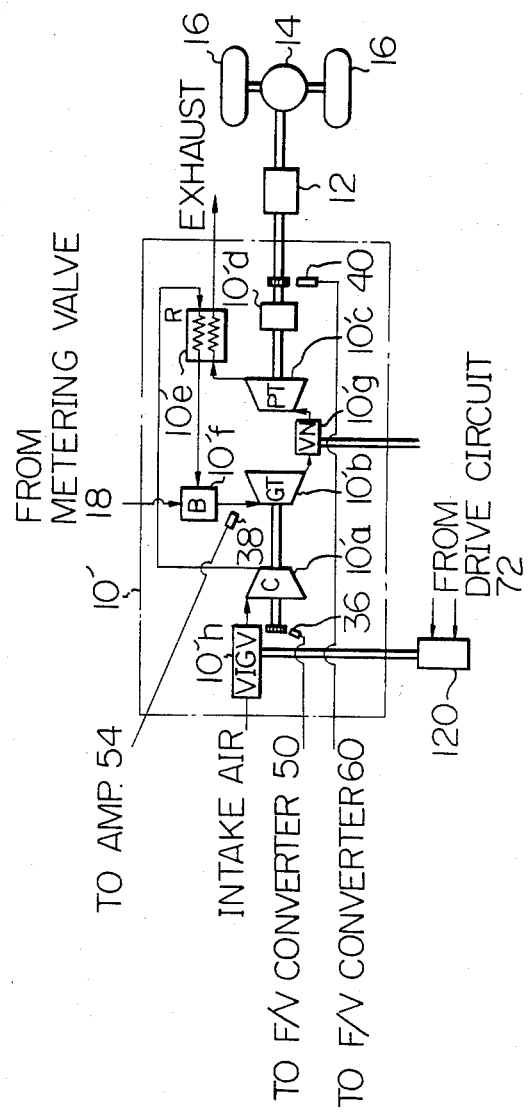
FIG. 10 is a block diagram illustrating a gas turbine engine according to a fourth embodiment of the present invention.

FIG. 10 illustrates a gas turbine engine and a transmission gear which receives the output of the engine according to a fourth embodiment of the present invention. In this embodiment, the operation speed is controlled not for the VN's but for the VIGV's. In FIG. 10, the compressor 10′a, gasifier turbine 10′b, power turbine 10′c, reduction gear 10′d, regenerator 10′e, burner 10′f, transmission gear 12, differential gear 14, wheels 16, gas temperature sensor 38, and electromagnetic pick-ups 36 and 40, are constructed quite in the same manner as those of FIG. 1. Unlike the above-mentioned embodiments, however, the VN's 10′g are set to operate at a constant speed. VIGV's 10′h are provided in an intake air path which leads to the compressor 10′a, thereby to adjust the flow rate of the intake air. In this embodiment, the VIGV's 10′h are driven by an actuator 120 which is constructed nearly in the same manner as the actuator 28 of the above-mentioned embodiments and are driven by signals from the drive circuit 72. Accordingly, when the actuator 120 is driven by the opening-closing instruction circuit 46, operation speed instruction circuit 48, and the drive circuit 72, which are shown in FIG. 4, the speed for opening the VIGV's 10′h is controlled depending upon a value $K_1 \cdot K_2 \cdot (N_S - N_G)$. As the VIGV's are operated toward the closing direction, the flow rate of the intake air decreases. If the rate of supply of fuel remains constant, therefore, the combustion temperature rises, whereby the gas temperature in the inlet portion of the turbine rises and the engine efficiency increases. As the VIGV's are operated toward the opening direction, on the other hand, the flow rate of the intake air increases. If the fuel is supplied at a rate which meets the flow rate of the intake air, the gas temperature in the inlet portion of turbine increases and the engine torque increases, too. Therefore, if the speed for opening the VIGV's 10′h is controlled depending upon $(N_S - N_G)$ during the accelerating condition, the consumption of fuel can be reduced as when the speed for opening the VN's is controlled in the aforementioned embodiments.

Figure 11:
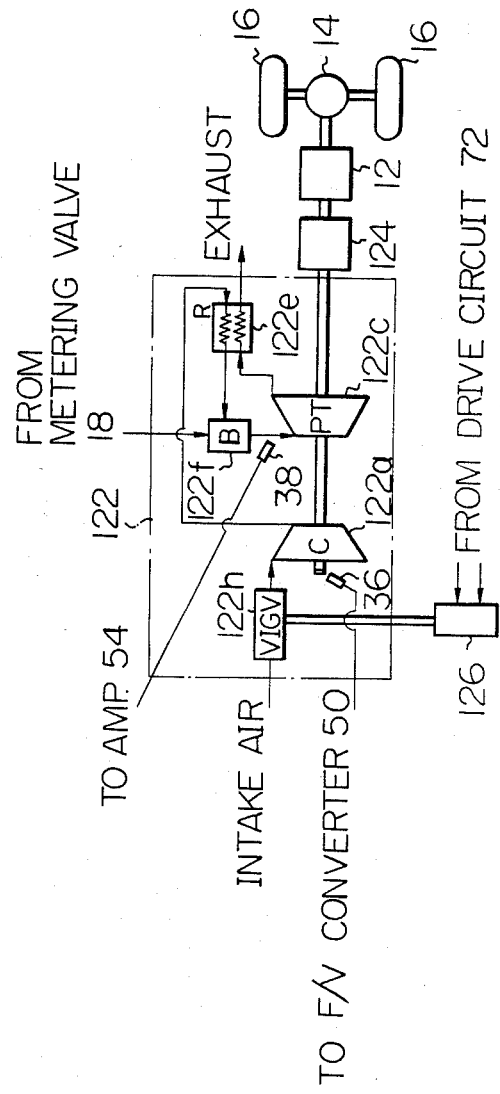
FIG. 11 is a block diagram illustrating a gas turbine engine according to a fifth embodiment of the present invention.

FIG. 11 is a diagram illustrating a gas turbine engine, a gear unit for receiving the engine output, and wheels according to a fifth embodiment of the present invention. According to this embodiment, use is made of a gas turbine engine with a signal rotating shaft assembly, and the speed for moving the VIGV's is controlled. With reference to FIG. 11, the gas turbine engine 122 with a single rotating shaft assembly has a compressor 122a and a power turbine 122c that are coupled together through the same axis. The power turbine 122c is connected to the transmission gear 122 via a continuously variable transmission 124. The intake air is sent to the compressor 122a via the VIGV's 122h, compressed, and sent to a burner 122f via a regenerator 122e. The gas from the burner 122f is sent to the power turbine 122c to drive it and is exhausted via the regenerator 122e.

The VIGV's 122h are driven by an actuator 126. The actuator 126 and the VIGV's 122h operate quite in the same manner as those of the fourth embodiment of FIG. 10. In the gas turbine engine with a single rotating shaft assembly, the running speed of the power turbine 122c is detected by a running speed detection means of the compressor 122a, as a matter of course.

According to the present invention as described in detail in the foregoing, provision is made of speed control means to control the speed for openig the variable nozzles VN's or to control the speed for opening the variable inlet guide vanes VIGV's. Therefore, the fuel efficiency can be greatly improved. Furthermore, since the speed for opening the VN's or VIGV's can be manually set, response characteristics of the engine can be arbitrarily set with respect to the depressed amount of the accelerator pedal to suit the liking of the driver.

As many widely different embodiments of the present invention may be constructed without departing from the spirit and scope of the present invention, it should be understood that the present invention is not limited to the specific embodiments described in this specification, except as defined in the appended claims.

I claim:

1. An apparatus for controlling a gas turbine engine of the type including a power turbine, a rotatable compressor, and variable nozzle means, disposed in an inlet portion of said power turbine and movable between at least an opened and a closed position, for controlling the flow rate of a gas into said turbine, said apparatus comprising:
    means for detecting the actual rotation speed of the compressor;
    interactive means for producing a desired compressor rotation speed value in response to user manipulation;
    means for detecting atmospheric temperature;
    means for correcting said desired compressor rotation speed value in response to said detected atmospheric temperature;
    means for calculating the difference between said corrected desired compressor rotation speed value and said detected actual rotation speed; and
    position changing means for changing the position of said variable nozzle means at a rate responsive to said calculated difference.

2. An apparatus as in claim 1 wherein said position changing means includes:
    means for moving said variable nozzle means between said closed position and said opened position; and
    opening rate control means for controlling said moving means to move said variable nozzle means from said closed position to said opened position at a rate directly proportional to the magnitude of said calculated difference.

3. An apparatus as in claim 2 wherein said position changing means further includes closing rate control means for controlling said moving means to move said variable nozzle means from said opened position to said closed position at a fixed rate.

4. An apparatus as in claim 2 wherein said position changing means further includes closing rate control means for controlling said moving means to move said variable nozzle means from said opened position to said closed position at a rate dependent upon said calculated difference.

5. An apparatus as in claim 2 wherein said position changing means further includes closing rate control means for controlling said moving means to move said variable nozzle means from said opened position to said closed position at a rate directly proportional to the magnitude of said calculated difference.

6. An apparatus as in claim 5 wherein:
    said opening rate control means includes means for controlling said moving means to move said variable nozzle means at a rate related to said calculated difference by a first degree of proportionality; and said closing rate control means includes means for controlling said moving means to move said variable nozzle means at a rate related to said calculated difference by said first degree of proportionality.

7. An apparatus as in claim 5 wherein:

said opening rate control means includes means for controlling said moving means to move said variable nozzle means at a rate related to said calculated difference by a first degree of proportionality; and said closing rate control means includes means for controlling said moving means to move said variable nozzle means at a rate related to said calculated difference by a second degree of proportionality different from said first degree of proportionality.

8. An apparatus as in claim 5 wherein said interactive means comprises:

a movable accelerator control manipulable by an extremity of the user; and means for detecting changes in the position of said control.

9. An apparatus as in claim 1 wherein:

said interactive means comprises means for producing an accelerator voltage $V_0$ in response to user manipulation, the level of said accelerator voltage being proportional to said desired compressor rotation speed value;

said atmospheric temperature detecting means comprises means for producing an atmospheric temperature signal $T_0$ the level of which is proportional to the atmospheric temperature; and said correcting means comprises means for computing the value of $$V_0 \cdot (1 + K_1 T_0)$$

where $K_1$ is a predetermined constant, to produce said corrected desired compressor rotation speed value.

* * * * *